United States Patent [19]
Bidlack et al.

[11] 3,976,847
[45] Aug. 24, 1976

[54] KEY TELEPHONE SYSTEM INTERCOM ARRANGEMENT

[75] Inventors: Richard Henry Bidlack, Boonton; Wayne Jay Egan, Eatontown; Steven Gary Miller, Freehold Township, Monmouth County, all of N.J.

[73] Assignee: Bell Telephone Laboratories, Incorporated, Murray Hill, N.J.

[22] Filed: Nov. 12, 1975

[21] Appl. No.: 631,410

[52] U.S. Cl.................................. 179/99; 179/1 HF; 179/81 B
[51] Int. Cl.²......................................... H04M 1/60
[58] Field of Search............... 179/1 H, 1 HF, 1 VC, 179/18 AD, 37, 81 B, 99

[56] References Cited
UNITED STATES PATENTS

| | | | |
|---|---|---|---|
| 3,743,791 | 7/1973 | Duff et al. | 179/81 B |
| 3,787,640 | 1/1974 | Bush et al. | 179/99 |
| 3,872,262 | 3/1975 | Kerman | 179/99 |
| 3,898,392 | 8/1975 | Jackson | 179/99 |
| 3,904,834 | 9/1975 | Shinoi et al. | 179/99 |

Primary Examiner—Kathleen H. Claffy
Assistant Examiner—Gerald L. Brigance
Attorney, Agent, or Firm—David H. Tannenbaum

[57] ABSTRACT

A key telephone system is disclosed in which intercom calls may be answered "hands-free" at the called station. Intercom calls are originated in the standard manner, with the subscriber picking up the handset at the calling station and dialing the number of the called station. A voice communication path is established through the station selector to the telephone set represented by the dialed number. DC bias on this communication path through the station selector activates a loudspeaker and microphone arrangement in the called telephone set. The called party may thus converse "hands-free" with the calling party by utilizing the activated loudspeaker and microphone of the station set, and need not manipulate the station set for the duration of the conversation.

13 Claims, 4 Drawing Figures

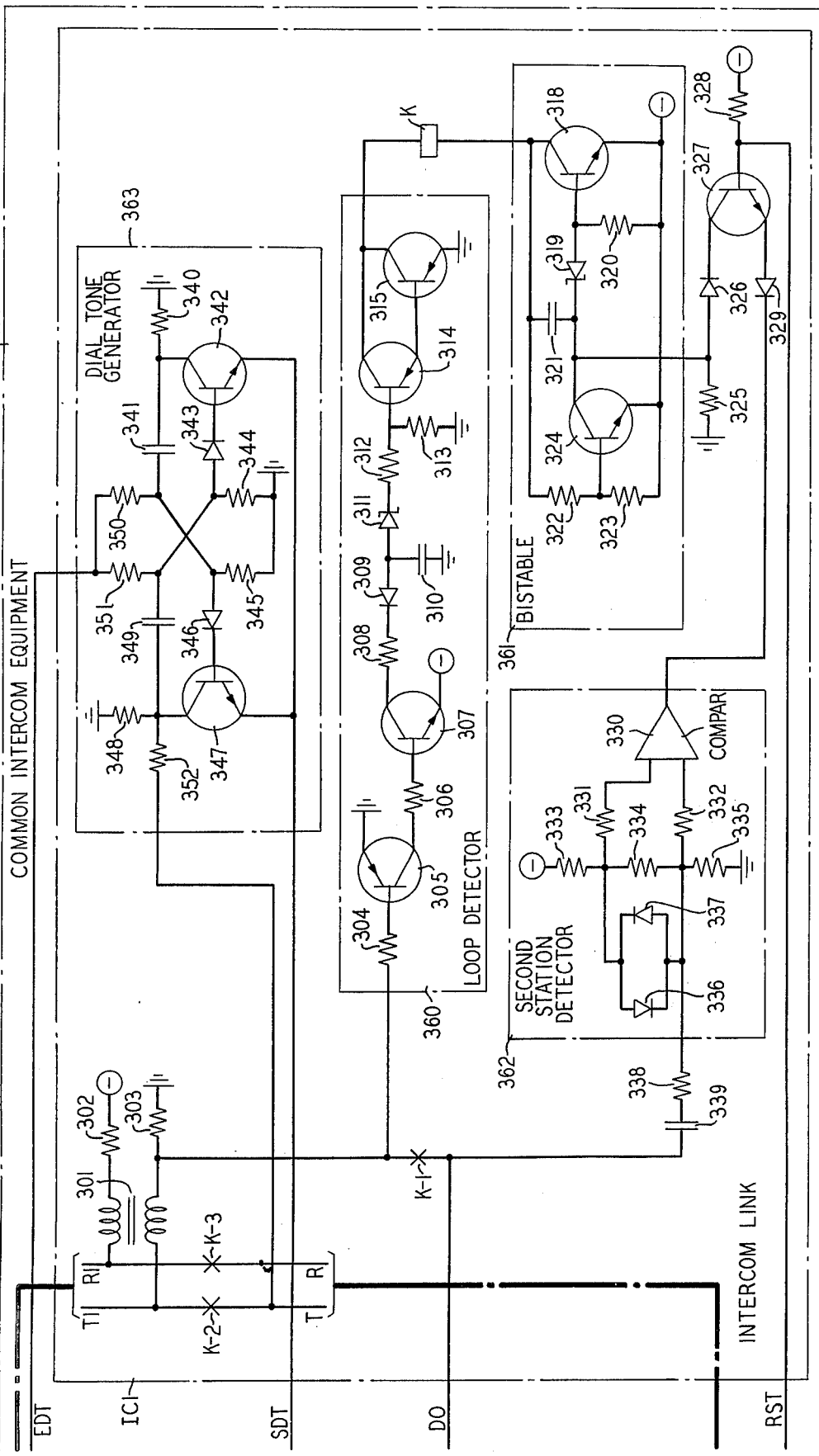

KEY TELEPHONE SYSTEM INTERCOM ARRANGEMENT

FIELD OF THE INVENTION

This invention relates to a key telephone system and in particular to an intercom arrangement which utilizes the station selector as an integral portion of the voice communication path.

DESCRIPTION OF PRIOR ART

Numerous loudspeaking intercom arrangements have been employed in business communication systems. The earliest systems comprised paging arrangements which provided unidirectional communication so that one station user could signal another through a loudspeaker in the called station set.

Later systems provided two unidirectional communication paths between stations equipped with loudspeaker and microphone facilities to enable two-way communication. The problem of feedback in these bidirectional systems was initially solved by providing manually-operable transmit/receive switches at each station set equipped with loudspeaker and microphone facilities. Later technological improvments provided automatic voice switching circuitry, thus eliminating the laborious manual switching previously required to carry on a conversation.

However, prior art loudspeaking communication systems have been plagued by the necessity of requiring the subscriber at the called station to initially activate the loudspeaker and microphone arrangement in the telephone station set to answer an intercom call. This problem has been overcome in some prior art arrangements, but only at the cost of providing extensive and expensive station selection facilities to activate the loudspeaker and microphone arrangement at the station set.

One prior art arrangement of interest is shown by the teaching of F. Duff et al., U.S. Pat. No. 3,743,791 issued July 3, 1973. The Duff patent shows a key telephone system in which each "hands-free" station set is equipped with loudspeaker and microphone facilities while the voice switching facilities are located in the common equipment. Extensive station selection facilities are also provided to activate the loudspeaker and microphone arrangement associated with the station uniquely defined by the digits dialed by the calling station.

The teaching of the Duff et al. patent, while obtaining the advantage of shared voice switching facilities, requires the provision of numerous leads between the common equipment and the station sets as well as extensive station selection facilities.

Another prior art arrangement of interest is shown by the teaching of S. Kerman, U.S. Pat. No. 3,872,262 issued Mar. 18, 1975. The Kerman patent shows a key telephone system in which all "hands-free" station sets are equipped with speakerphone facilities. Extensive station selection facilities are also provided to activate the speakerphone facilities associated with the station uniquely defined by the digits dialed by the calling station.

While overcoming the problem of numerous leads between the station set and the common equipment, the teaching of the Kerman patent requires equipping each "hands-free" station set with expensive voice switching circuitry as well as extensive station selection facilities.

In implementing the "hands-free" intercom feature, all prior art arrangements require the provision of two separate and distinct facilities — voice communication facilities and station selection facilities. These facilities generally comprise extensive and expensive circuitry, rendering the "hands-free" intercom feature a costly addition to key telephone systems.

In loudspeaking intercom systems, it is obviously desirable to provide facilities to enable the called party to answer an intercom call "hands-free".

In view of the foregoing, an object of this invention is to provide a loudspeaking intercom system that enables the called party to answer an intercom call "hands-free", thus providing rapid communication between the calling and called parties.

It is a further object of this invention to provide rapid communication between the calling and called parties by utilizing existing facilities and without the necessity of providing extensive and expensive additional circuitry, thereby providing loudspeaking intercom facilities that are of less cost and complexity than prior art systems.

SUMMARY OF THE INVENTION

In accordance with our invention, we provide facilities for enabling hands-free answering of intercom calls. This is accomplished by equipping all or some key telephone station sets in the system with a loudspeaker and microphone arrangement in addition to the regular communication handset. An intercom call is originated in the standard manner by a station user going off-hook on an intercom line and dialing a station number into the station selector. In response to the dialed digits, a communication path is established from the calling party through the station selector to the station set uniquely defined by the dialed number.

This communication path extends from the calling party station set via the intercom link to a common intercom voice switch. A unidirectional communication path extends from the output of the common intercom voice switch through the station selector to the loudspeaker arrangement in the called station set. A unidirectional communication path also exists in the reverse direction, extending from the microphone arrangement in the called station set via a common voice communication path to an input of the common intercom voice switch.

DC bias on this established communication path activates the loudspeaker and microphone arrangement in the called station set and the calling and called parties may immediately and uninterruptedly converse "hands-free" without the called party having to manipulate his station set.

Thus, in the disclosed arrangement, the voice communication function is combined with the station selection function to provide the "hands-free" intercom feature. This is accomplished by utilizing the station selector circuit as an integral portion of the voice communication path as well as for station selection.

Accordingly, it is a feature of the invention to provide in a loudspeaking intercom system, facilities for establishing a communication path between the calling and called stations, where the communication path is established through the station selector.

A further feature of the invention is the provision of facilities for enabling a subscriber to answer an intercom call "hands-free" and to uninterruptedly converse "hands-free" on this intercom call, where such facilities are exclusively activated and controlled by signals on the communication path established between the calling and called stations through the station selector.

BRIEF DESCRIPTION OF THE DRAWING

The operation and utilization of the present invention will be more fully apparent from the following description of the drawing, in which:

FIGS. 2 and 3 show a detailed circuit diagram of a preferred embodiment of the invention; and FIG. 4 shows the manner in which FIGS. 2 and 3 should be arranged.

GENERAL DESCRIPTION — FIG. 1

Figure 1:
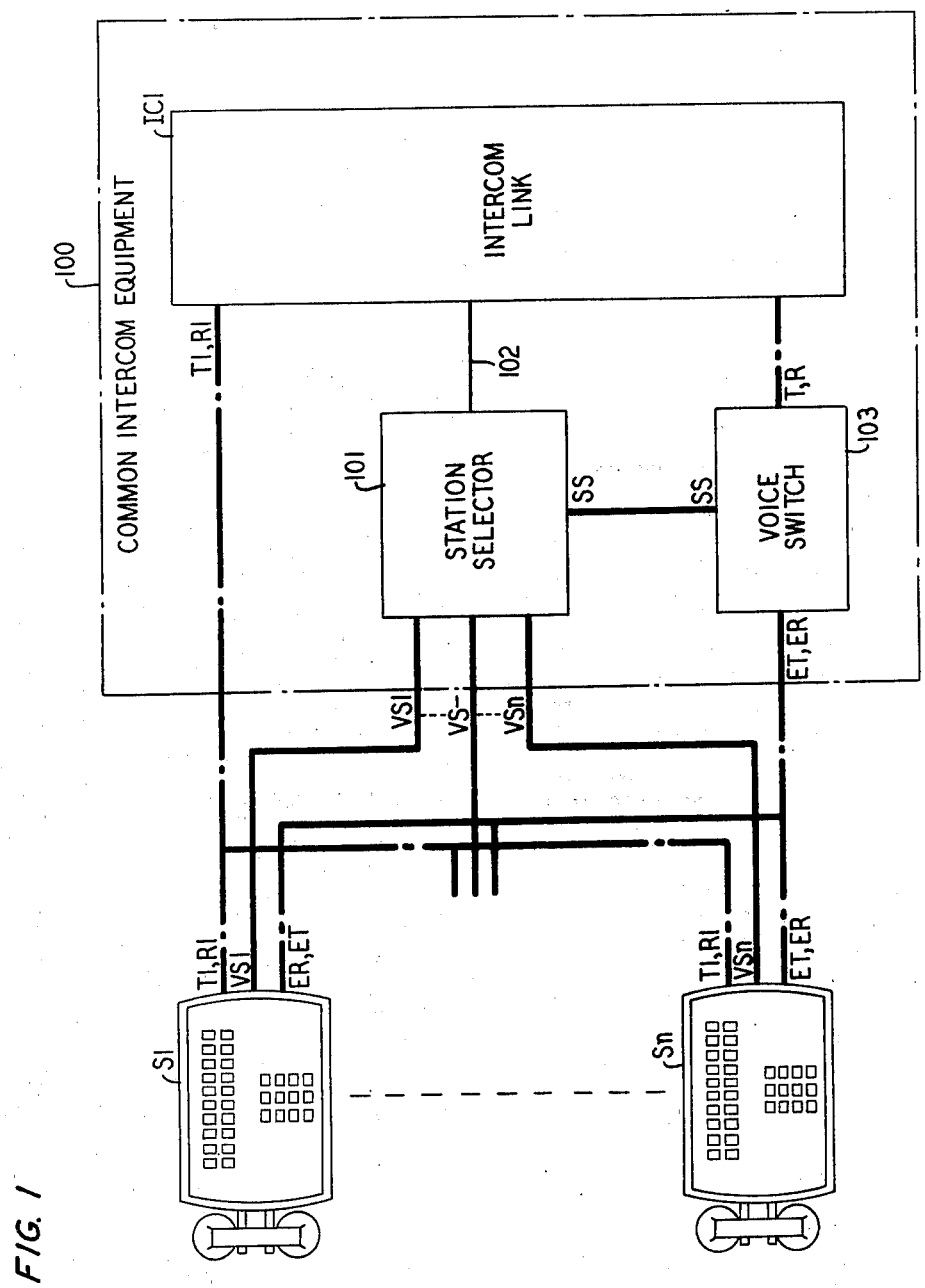
FIG. 1 illustrates one embodiment of the invention in block diagram form.

FIG. 1 shows one embodiment of our invention wherein a number of key telephone station sets S*l* through S*n* are connected to common intercom equipment 100. The common intercom equipment consists of an intercom link IC*l*, station selector 101 and voice switch 103.

Each key telephone station set is equipped with line pickup keys which enable the station user to access any one of the number of intercom links in the system. For clarity, only one intercom link, IC*l*, is shown. Intercom link IC*l* is accessed by the subscriber depressing the line pickup key associated with this intercom link, thus establishing a communication connection between the station handset and intercom link IC*l* via leads T*l* and R*l*.

Each station set is also equipped with a loudspeaker and microphone arrangement which is connected to common intercom equipment 100 by common voice communication path, leads ET and ER. Dedicated communication leads VS*l* through VS*n* are also provided on a one-to-one basis from common intercom equipment 100 to each loudspeaker and microphone arrangement associated with key telephone station sets S*l* through S*n*.

The invention can be further appreciated by describing the processing of a typical intercom call between two stations. Assume that the subscriber at key telephone station set S*l* wishes to initiate an intercom call to station S*n*. The subscriber at station S*l* accomplishes this by picking up the handset and depressing the line pickup key on station set S*l* associated with intercom link IC*l*. This operation connects the subscriber to intercom link IC*l* via the common intercom communication path, leads T*l* and R*l* associated with intercom link IC*l*.

Intercom link IC*l* is activated by the off-hook condition of key telephone station set S*l* and connects this key telephone station set to voice switch 103 by connecting leads T*l* and R*l* to leads T and R. Intercom link IC*l* also connects station set S*l* via lead 102 to station selector 101 and provides dial tone back to the subscriber. The subscriber now dials the digits representing station S*n* into station selector 101.

Upon the completion of dialing, station selector 101 connects the output of voice switch 103, lead SS, to communication path VS*n* associated with station S*n*. DC bias on this communication path from voice switch 103 activates the loudspeaker and microphone arrangement associated with station set S*n*. Station selector 101 applies a tone burst to the activated loudspeaker via to communication path VS*n* to alert the subscriber at station S*n*.

The subscriber at station S*l* is now connected through intercom link IC*l*, voice switch 103, and station selector 101 to the activated loudspeaker arrangement at station S*n*. Likewise, the output of the activated microphone arrangement at station S*n* is applied to common voice communication path, leads ER, ET, and through voice switch 103 and intercom link IC*l* to station S*l* via leads T*l* and R*l*. Thus, a bidirectional communication connection is established between the calling and called parties and the subscriber at station S*n* need not manipulate the station set to converse with the calling party. He can converse "hands-free" by utilizing the activated loudspeaker and microphone arrangement associated with station set S*n* for the duration of the intercom call.

The subscriber at the called station can revert to standard handset operation by picking up the handset and depressing the line pickup key associated with intercom link IC*l*, thus connecting station S*l* with station S*n* via leads T*l* and R*l*. This operation is detected by intercom link IC*l* which releases station selector 101 and voice switch 103, enabling these circuits to be used for another intercom call.

DETAILED DESCRIPTION — FIGS. 2 THROUGH 4

Figure 2:
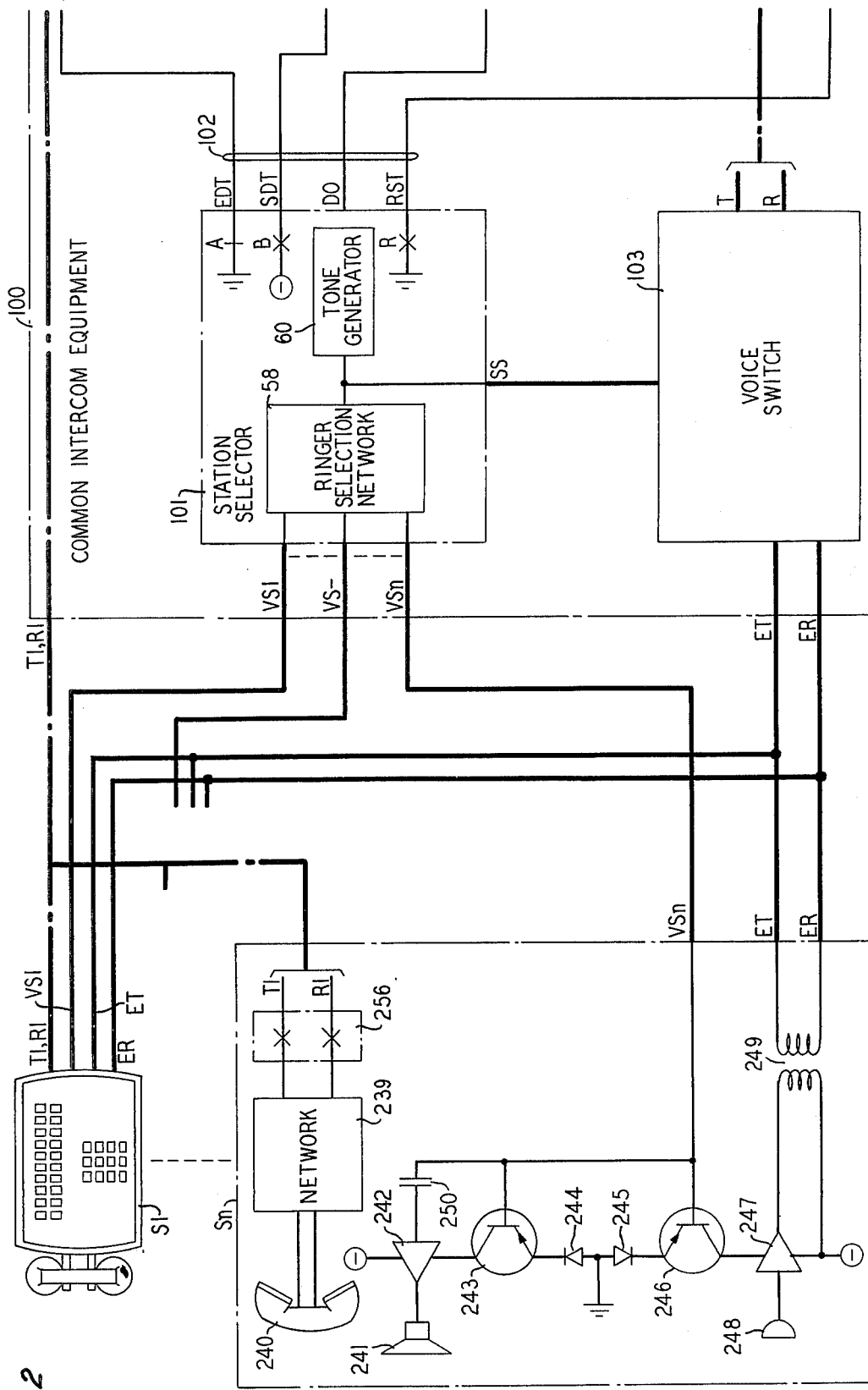

Drawing FIGS. 2 and 3, when arranged with respect with each other as shown in FIG. 4, illustrate how the various elements or our inventive embodiment cooperate to provide the hands-free answer on intercom feature. The various equipments such as key telephone station sets, station selector, etc. are oriented with respect with each other on FIGS. 2 and 3 in a manner analogous to that of FIG. 1.

The description of FIGS. 2 and 3 is made with respect to the same call conditions assumed for FIG. 1; namely, a subscriber at station S*l* wishes to initiate an intercom call to a subscriber at station S*n* in the key telephone system.

INTERCOM CALL ORIGINATION

The subscriber at station S*l* initiates the intercom call by picking up the handset and depressing the line pickup key on key telephone station set S*l* corresponding to intercom link IC*l*. The operation of the line pickup key establishes a communication path from the handset through the network (not shown) of station set S*l* to intercom link IC*l* via leads T*l* and R*l*.

BATTERY FEED AND LOOP DETECTION

Talking battery is supplied by intercom link IC*l* to this closed loop communication path, leads T*l* and R*l*. Current is supplied by intercom link IC*l* through resistor 303 and one winding of transformer 301 to key telephone station set S*l* via lead T*l*, returning via lead R*l* and the other winding of transformer 301 and resistor 302 to negative battery. The voltage drop across resistor 303 caused by this loop current is detected by the loop detector 360, comprising transistors 305, 307, 314, 315, diode 309, Zener diode 311, capacitor 310, and resistors 304, 306, 308, 312, 313. Loop detection is accomplished by the voltage drop across resistor 303 activating transistors 305 and 307. Transistor 307, in turn, draws current through resistor 308 and diode 309, discharging capacitor 310. Capacitor 310 and Zener diode 311 combination provides a time delay for preventing the erroneous propagation of a noise signal as a result of transient voltages on the communication path. Capacitor 310 must be discharged by transistor 307 before Zener diode 311 breaks down, activating Darlington transistor pair 314 and 315, thus providing a time delay. Transistor 318 of bistable 361 is normally ON, so the output current of Darlington transistor pair 314 and 315 drives relay K. Relay K operated extends the established communication path from intercom link IC*l* to voice switch 103 by connecting leads T*l* and R*l* through closed contacts K-1 and K-2 to leads T and R. Thus, a communication path is established from station set Sl to voice switch 103 via intercom link IC*l*.

VOICE SWITCH

Voice switching communication circuits are well known, especially in the loudspeaking telephone art. The voice switch circuit taught by F. J. Clement, U.S. Pat. No. 3,395,255, issued July 30, 1968 is illustrative of the type of voice switch used in the disclosed embodiment. A voice switch circuit enables conventional 2-wire station sets to communicate with loudspeaker and microphone equipped stations which require two unidirectional communication paths.

In the present disclosure, station set S*l* is being used in the conventional 2-wire mode and thus is connected to the 2-wire input, leads T and R, of voice switch 103. The unidirectional communication from voice switch 103 to called station set S*n* is applied by voice switch 103 to lead SS while the return unidirectional communication from station set S*n* to voice switch 103 arrives at voice switch 103 on common voice communication path, leads ET and ER.

DIAL TONE SUPPLIED

Dial tone is applied to the established communication path by the dial tone generator 363, comprising resistors 340, 344, 345, 348, 350, 351, 352, capacitors 341, 349, diodes 343, 346, transistors 342, 347. These elements comprise an astable collector-coupled multivibrator. The operation of an astable collector-coupled multivibrator such as disclosed here is well-known in the art and is described in the textbook "Pulse, Digital, and Switching Waveforms", by Millman and Taub, McGraw-Hill, 1965, pages 438 through 445.

For the purposes of this invention, it is sufficient to say that the multivibrator is activated by the presence of a negative potential on lead SDT and thence supplied dial tone to the communication path and station S*l* via resistor 352. The subscriber at station S*l* hears dial tone and can now dial the digits representing called station S*n*. These dialed digits are received and processed by station selector 101.

STATION SELECTOR

Station selectors are a basic part of key telephone systems and are well known in the art. The station selector used in the present disclosure is of the type taught by C. E. Morse U.S. Pat. No. 3,450,845, issued June 17, 1969. These station selectors function to detect and count the dial pulses generated by the calling station. In response to the dialed digits, the station selector operates the ringer selection network 58 to signal the station uniquely described by the dialed digits.

In the disclosed embodiment, the station selector differs from that taught by the C. E. Morse patent in that ringing generator 60 used to signal the called station has been replaced by a tone generator 60. Also, ringer selection network 58 is used to establish a unidirectional voice communication path from voice switch 103 to the called station by connecting lead SS to a loudspeaker arrangement (subsequently described) in the called station. Thus, the station selector in the present disclosure constitutes an integral portion of the intercom voice communication path rather than merely functioning the signal the called station.

DIGITS DIALED

The above-described initiation of an intercom call causes relay B in station selector 101 to operate, placing the aforementioned negative potential on lead SDT, activating dial tone generator 363 of intercom link IC*l*. The dial pulses generated by station S*l* are extended on lead T*l*, through one winding of transformer 301, through contact K-1 and lead DO to station selector 101. In response to the first dial pulse received, station selector 101 releases relay A, placing ground on lead EDT to dial tone generator 363 of intercom link IC*l*. Ground from lead EDT is applied through resistors 350 and 351 to the base of transistors 342 and 347 of dial tone generator 363 driving these transistors into saturation, thus disabling dial tone generator 363 and removing dial tone from the communication path.

Station selector 101 counts the dial pulses, and, upon completion of dialing, operates relay R, placing ground on lead RST to second station detector 362 indicating that dialing is complete. In addition, station selector 101 establishes a unidirectional communication path from lead SS, the output of voice switch 103, to the station represented by the dialed digits, station S*n*, via dedicated communication lead VS*n* corresponding to station S*n*. Thus, a voice communication path is completed from the calling station S*l* to the intercom link IC*l* via leads T*l* and R*l* and thence via leads T and R to voice switch 103 and then via lead SS to station selector 101 and through ringer selection network 58 of station selector 101 to station S*n* via dedicated communication lead VS*n*.

ALERTING SIGNAL APPLIED TO CALLED STATION

Each key telephone system set in the key telephone system is equipped with loudspeaker and microphone facilities, herein disclosed in called station set S*n*. These facilities include amplifier 242 which amplifies incoming voice signals that pass through dc blocking capacitor 250 from communication lead VS*n*. Amplifier 250 applies the amplified signals to loudspeaker 241. The output of microphone 248 is amplified by amplifier 247 and applied through transformer 249 to common voice communication path, leads ET and ER. The common voice communication path transmits the microphone output signals from station S*n* to the input of voice switch 103 and thence through intercom link IC*l* to station S*l*. These amplifier facilities are normally in the OFF state, being under the control of transistors 243 and 246.

Upon the completion of a communication path from station S*l* to station S*n*, dc bias is placed on communication lead VS*n* by voice switch 103. This dc bias activates transistors 243 and 246 in loudspeaker and microphone arrangement associated with station set S*n*. Power is now supplied to amplifiers 242 and 247 through transistors 243 and 246 and the loudspeaker and microphone arrangement can be utilized.

Coextensive with the path completion, the station selector applies an alerting tone burst to the communication path to alert the subscriber at the called station that an intercom call has been completed to the station set. This is accomplished by station selector 101 applying a tone burst signal from tone generator 60 to the communication path established by ringer selection network 58 to dedicated communication lead VS*n*. This tone is amplified at station Sn by amplifier 242 and applied to loudspeaker 241.

The application of the audible tone burst to loudspeaker 241 alerts the subscriber at station S*n*. The subscriber may now converse with the calling party "hand-free" by utilizing the activated loudspeaker and microphone in his station set. This conversation continues uninterruptedly until either the calling party goes on-hook or the called party switches to handset operation.

CALLED PARTY SWITCHES TO HANDSET OPERATION

The called party may switch to regular handset operation and terminate the "hands-free" mode of communication by picking up the handset 240 and operating the line pickup key 256 associated with intercom link IC*l*. Operation of this line pickup key connects station set Sn to the same T*l* and R*l* leads being used by the calling station S*l*.

The switching of additional impedance on to leads T*l* and R*l* caused by the calling party switching station set network 239 on to the T*l* and R*l* leads generates a negative pulse on the T*l* lead. This negative pulse also appears at the input of second station detector 362, consisting of diodes 336, 337, resistors 331, 332, 333, 334, 335 and comparator 330. The negative pulse appearing on lead T*l* is applied through capacitor 339 and resistor 338 to a voltage limiter consisting of diodes 336 and 337. The pulse is then applied through a voltage divider network, consisting of resistors 331 through 335, to one input of comparator 330. The application of this signal to one input of comparator 330 causes the comparator to apply a negative pulse through diode 329 to transistor 327. Transistor 327 functions as an AND gate. The coincidence of a negative pulse on the emitter and the aforementioned positive signal on the base from the station selector via lead RST (indicating that dialing is completed) activates transistor 327. Transistor 327 turning ON draws current through diode 326 thereby reducing the voltage at the collector of transistor 324. This voltage drop turns OFF transistor 318 releasing relay K and turning ON transistor 324.

Relay K released opens the communication path from intercom link IC*l* to voice switch 103 by opening contacts K-2 and K-3. The opening of contact K-1 removes ground from lead DO causing station selector 101 to release.

CALLING PARTY TERMINATES CALL

An alternative method of terminating the "hands-free" communication connection is for the calling party at station S*l* to go on-hook and end the intercom call. The on-hook condition of station Sl is detected by the aforementioned loop detector 360, which releases relay K. Relay K released opens the communication path from intercom link IC*l* to voice switch 103 by opening contacts K-2 and K-3, causing voice switch 103 to go idle. Relay K released also removes ground from lead DO causing station selector 101 to go idle. Thus, common intercom equipment 100 is idle and can process another intercom call.

While a specific embodiment of the invention has been disclosed, variations in procedural and structural detail within the scope of the appended claims are possible, and are contemplated. There is no intention of limitation to what is contained in the abstract of the exact disclosure as herein presented. The above described arrangements are only illustrative of the application of the principles of the invention. Normally, other arrangements may be devised by those skilled in the art without departing from the spirit and scope of the invention.

What is claimed is:

1. In a key telephone system, an intercom arrangement comprising:
    a plurality of key telephone station sets;
    an intercom link for interconnecting any one of said key telephone station sets to any other of said key telephone station sets;
    a station selector connected to said intercom link for receiving dialed digit data from a first one of said key telephone station sets which is connected to said intercom link;
    a plurality of dedicated communication paths corresponding on a one-to-one basis to each of said plurality of key telephone station sets for connecting said station selector to each of said key telephone station sets;
    each said key telephone station set including loudspeaker means for providing an audible representation of voice signals appearing on said dedicated communication path corresponding to said key telephone station set; and
    means responsive to dialed digit data from said first key telephone station set for establishing a unidirectional voice communication connection through said station selector from said intercom link to a called one of said key telephone station sets uniquely defined by said dialed digit data via the one of said dedicated communication paths corresponding to said called key telephone set.

2. The invention of claim 1 wherein said key telephone system additionally comprises:
    means operable in response to said dialed digit data for generating a distinct tone burst; and
    means responsive to said generating means for applying said tone burst to said unidirectional voice communication connection such that said loudspeaker means provides an audible representation of said tone burst to alert the subscriber at said called key telephone set.

3. The invention of claim 2 wherein said key telephone system additionally comprises:
    a unidirectional common intercom voice communication path connecting all of said key telephone station sets to said intercom link; and
    voice switch means for interfacing said intercom link with said unidirectional common intercom voice communication path and said established unidirectional voice communication connection.

4. The invention of claim 3 wherein each said key telephone station set additionally includes:
    microphone means for providing voice signals representative of audible signals appearing on the input of said microphone means to said unidirectional common intercom voice communication path; and means operable in response to the establishing of said unidirectional voice communication connection to said called key telephone station set for activating said microphone means of said called key telephone station set such that a subscriber at said called key telephone station set can communicate "hands-free" with a subscriber at said first key telephone station set over said unidirectional common intercom voice communication path via said voice switch means.

5. The invention of claim 4, wherein said loudspeaker means and said microphone means in said called key telephone station set are enabled by a dc bias placed by said station selector on said dedicated communication path corresponding to said called key telephone station set.

6. The invention of claim 5 additionally comprising means for detecting the establishment of a second voice communication connection between said called key telephone station set and said intercom link where said second voice communication connection is established by the subscriber at said called key telephone station set going off-hook and operating the key on said called key telephone station set corresponding to said intercom link; and means responsive to the detection of the establishment of a second voice communication connection for releasing said unidirectional voice communication path and said unidirectional common voice intercom path such that said first key telephone station set and said called key telephone station set are interconnected solely via said intercom link and the subscriber at said called key telephone station set can no longer communicate "hands-free".

7. The invention of claim 6 wherein said detecting means includes means for sensing the change in the current supplied by said intercom link occasioned by the connection of said called key telephone station set to said intercom link.

8. In a key telephone system, an intercom arrangement comprising:
a plurality of key telephone station sets, each having a bidirectional communication path;
an intercom link for interconnecting any of said key telephone station sets to any other of said key telephone station sets over said bidirectional communication path;
a station selector connected to said intercom link for receiving dialed digit data and voice signals over said bidirectional communication path from a first one of said key telephone station sets which is connected to said intercom link;
a plurality of unidirectional dedicated voice signal communication paths corresponding on a one-to-one basis to each of said plurality of key telephone station sets for connecting said station selector to each of said key telephone station sets;
a single unidirectional intercom voice communication path common to all of said key telephone station sets for connecting all of said telephone station sets to said intercom link;
each said key telephone station set including:
loudspeaker means for providing an audible representation of voice signals appearing on said dedicated communication path corresponding to said key telephone station set,
microphone means for providing voice signals representative of audible signals appearing on the input of said microphone means to said single unidirectional intercom voice communication path;
means responsive to dialed digit data from said first key telephone station set for establishing a unidirectional voice communication connection from said intercom link through said station selector to a called one of said key telephone station sets uniquely defined by said dialed digit data via the one of said dedicated communication paths corresponding to said called key telephone set; and
means operable in response to the establishment of said unidirectional voice communication connection to said called key telephone station set for activating said microphone means and said loudspeaker means of said called key telephone station set such that a subscriber at said called key telephone station set can communicate "hands-free" with a subscriber at said first key telephone station set over said unidirectional common intercom voice communication path.

9. The invention of claim 8 wherein said key telephone system additionally comprises voice switch means for interconnecting said unidirectional voice communication path and said single unidirectional intercom voice communication path with said intercom link to which said first key telephone station set is connected via said bidirectional communication path.

10. The invention of claim 9 wherein said loudspeaker means and said microphone means in said called key telephone station set are enabled by a dc bias placed by said station selector on said dedicated communication path corresponding to said called key telephone station set.

11. The invention of claim 10 wherein said key telephone system additionally comprises:
means operable in response to said dialed digit data for generating a distinct tone burst, and
means responsive to said generating means for applying said tone burst to said unidirectional voice communication connection such that said loudspeaker means provides an audible representation of said tone burst to alert the subscriber at said called key telephone station set.

12. The invention of claim 11 additionally comprising means for detecting the establishment of a second voice communication connection between said called key telephone station set and said intercom link where said second voice communication connection is established by the subscriber at said called key telephone station set going off-hook and operating the key on said called key telephone station set connecting said called key telephone station set to said intercom link via said bidirectional communication path; and means responsive to the detection of the establishment of a second voice communication connection for releasing said unidirectional voice communication path and said single unidirectional voice intercom path such that said first key telephone station set and said called key telephone station set are interconnected solely via said bidirectional communication path to said intercom link and the subscriber at said called key telephone station set can no longer communicate "hands-free".

13. The invention of claim 12 wherein said detecting means includes means for sensing the change in the current supplied by said intercom link occasioned by the connection of said called key telephone station set to said bidirectional communication path to said intercom link.

* * * * *